United States Patent [19]
Pavelle et al.

[11] Patent Number: 5,414,476
[45] Date of Patent: May 9, 1995

[54] OPHTHALMIC DEVICE USING A SINGLE LINEARLY POLARIZING ELEMENT

[76] Inventors: Richard Pavelle, 23 Berkshire Dr., Winchester, Mass. 01890; Paul Burstein, 19 Glengarry, Winchester, Mass. 01890

[21] Appl. No.: 53,172

[22] Filed: Apr. 26, 1993

[51] Int. Cl.⁶ ............................................. G02C 7/12
[52] U.S. Cl. .................................... 351/49; 351/44
[58] Field of Search ............... 351/49, 44, 47, 57, 351/41

[56]  References Cited

U.S. PATENT DOCUMENTS

| | | |
|---|---|---|
| 2,005,426 | 6/1935 | Land . |
| 2,251,330 | 8/1941 | Fairbank . |
| 2,298,058 | 10/1942 | Land . |
| 2,304,504 | 12/1942 | Metzger et al. . |
| 2,377,313 | 5/1943 | Casier . |
| 2,380,481 | 7/1945 | Tillyer et al. . |
| 2,453,698 | 11/1948 | Campbell ................. 351/49 |
| 2,565,362 | 8/1951 | Eloranta . |
| 2,688,900 | 2/1951 | Silverman . |
| 2,813,459 | 4/1954 | Archambault . |
| 3,958,867 | 5/1976 | Morgan . |
| 4,119,369 | 10/1978 | Eloranta et al. . |
| 4,149,780 | 4/1979 | Young ........................ 351/49 |
| 4,744,633 | 5/1988 | Sheiman .................... 351/49 |
| 4,818,091 | 4/1989 | Sodun et al. ............... 351/49 |
| 5,210,552 | 5/1993 | Baran et al. ............... 351/49 |

FOREIGN PATENT DOCUMENTS 392818  4/1991  Japan .................... 351/49

*Primary Examiner*—William L. Sikes
*Assistant Examiner*—Hung Xuan Dang
*Attorney, Agent, or Firm*—Sprung Horn Kramer & Woods

[57] ABSTRACT

An ophthalmic device comprises a frame having a pair eye apertures and first and second linearly polarizing elements fixedly or rotatably mounted in the apertures. The first and second elements each have a polarizing transmission axis and the axes are fixedly or selectively disposed at an angle of 45° to 90° with respect to each other.

4 Claims, 1 Drawing Sheet

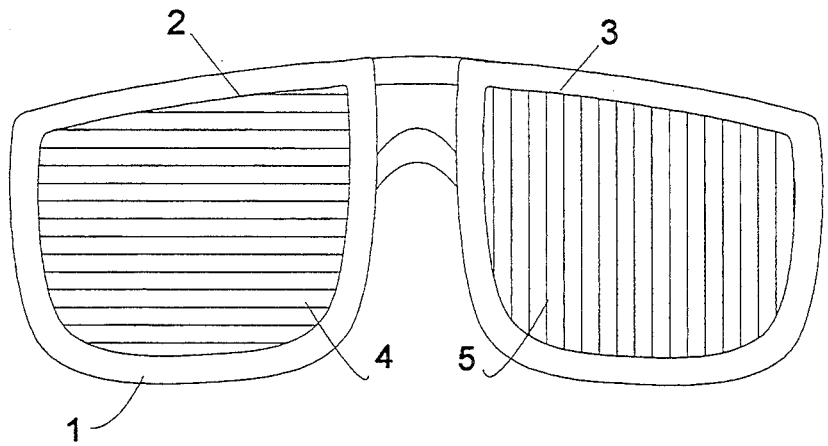
FIGURE 1
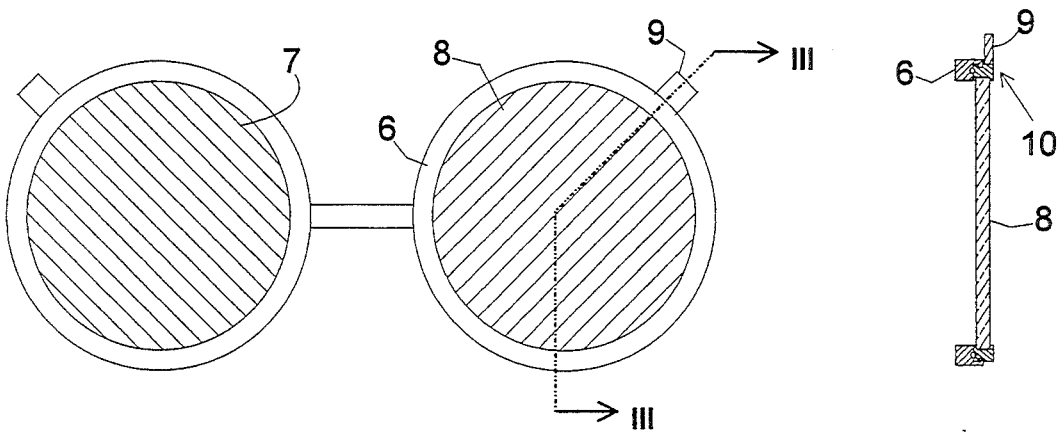
FIGURE 2
FIGURE 3
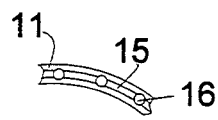
FIGURE 4
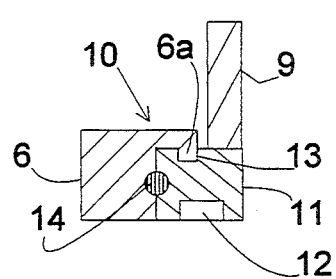
FIGURE 5

OPHTHALMIC DEVICE USING A SINGLE LINEARLY POLARIZING ELEMENT

BACKGROUND OF THE INVENTION

The present invention is directed to an ophthalmic device and in particular to a device using a single linearly polarizing element (LPE) as a lens.

It has been found that reflected light always contains at least some net polarized component. The net polarization is not a function of brightness, but of illumination angle, (e.g., sun angle), materials being observed and observation angle. Thus net polarization and direction of maximum polarity present an additional dimension of image data not available to the naked eye.

There is a large body of literature describing LPE's for reducing glare and light transmission. When an LPE is oriented horizontally, for example, glare from a low sun is almost completely eliminated. There exists a large body of prior art, including Land's fundamental patent (U.S. Pat. No. 2,005,426), that describes devices for providing variable light transmission by employing a plurality of superimposed LPE's. In each case, the effect has been to reduce the light transmission below the ambient level and to vary that transmission equally in both eyes. Along different lines the U.S. patent issued to Morgan (U.S. Pat. No. 3,958,867) and prior art noted therein relates to adjustable lenses to permit the user to modify the positions of corrective lenses such as bifocals or to modify light transmission characteristics as in the case of sunglasses. Morgan's description is fundamentally no different from existing ophthalmologists' equipment of the early 20th century, that is used to prescribe corrective lenses. Such standard ophthalmic office equipment provides a plurality of lenses that attach to special eyeglass structures. The ophthalmologist can flip, rotate or otherwise orient the lenses over each eye independently by using a plurality of elements in each lens to provide a means for corrective lenses.

SUMMARY OF THE INVENTION

Up to now, all devices having LPE's have been used to provide a means of producing identical images on retinas of both eyes. These devices act to vary the intensity of the light as received by the eyes by varying the transmission of the lenses. The present invention presents different images of the same scene on the two retinas. The difference in these images causes an "ocular dissonance" that draws the user's attention to the specific regions of difference through the brain's interpretation of the differences in data.

The present invention uses a single linearly polarizing element as a lens for each eye. Implementations of this invention include sunglasses, goggles, masks and the like. The invention also has uses in sports, nondestructive testing and inspection, entertainment, and military camouflage, as well as other fields.

The present invention does not relate to varying the light transmission characteristics, but rather to emphasizing the effects of the net polarization of the ambient scene or landscape. The present invention provides an apparent stereoscopic view of those elements in the scene that have a net polarization that differs from that of the background. The stereoscopic effect is most pronounced at small angles (e.g., 10 degrees or less) of incidence and reflection. For example, when used to observe road surfaces when driving, the invention provides enhanced visibility of subtle differences in road surface such as "black ice," manhole covers and repaired areas.

When a scene is observed through linear polarizing elements whose transmission angles are at different orientations for the left and right eyes of from 45° to 90°, preferably 70° to 90° and most preferably at 90°, a difference is generated in the images that reach the two eyes. The perception of these images is such that certain features in the scene seem to "jump out" at the user in an apparent and exaggerated three dimensional or stereoscopic effect. This enables the user to discern much more clearly subtle features that have a different net polarization from the background. A device of this type is of great use, for example, to a golfer looking for subtle differences in the contour of a putting green.

These and other features and advantages of the present invention are achieved in accordance with the present invention by an ophthalmic device comprising a frame having a pair of eye apertures and a single linearly polarizing element fixedly or rotatably mounted in each aperture.

The two elements each have one light polarizing transmission axis, and in the embodiment where both elements are fixed, the axes are disposed at an angle of 45° to 90° with respect to each other At angles of less than 45°, the effect is barely noticeable. In a preferred embodiment, the axes are disposed at angle of 70° to 90° and in a more preferred embodiment, they are disposed at an angle of 90° with respect to each other. In a particularly advantageous embodiment, one axis is disposed horizontally and the axis of the other lens is disposed vertically when the device is worn by a user.

In the embodiment with the rotatable mounting, one or both of the LPEs is free to rotate within the frame, so that the direction of polarization transmission can be varied by the user. In this way, the user can adjust one or both angles of polarization independently. By such an adjustment, the user can maximize the effect of "ocular dissonance" and the resulting stereoscopic emphasis on the most subtle of differences in any particular scene. One method for finding and maintaining a particular orientation is with the use of detents in the rotatable element. This is just one example of a rotating mechanism that has a discrete (i.e., non-continuous) number of stable positions.

The maximum effect of such a rotatable mounting will be seen when the two elements can rotate and maintain a difference of 90 degrees in polarization axes of the LPEs. These rotations can be accomplished independently or by corotating the LPEs. Different users will choose somewhat different orientations based upon individual eye dominance and other characteristics. For example, one user may choose a left LPE to be horizontal and the right LPE to be vertical, while another user may choose the opposite orientations.

The invention is of great use, for example, to a hunter or bird-watcher, surveying a scene, who will have an enhanced ability to find an animal that otherwise blends into the background. Other examples of general sports activities where the device will be useful include sailors' and fishermen's being able to "read" the water and skiers' seeing ice and different snow conditions more easily.

The present invention will also be of use in nondestructive testing and areas of visual inspection where the effects of small discontinuities in an otherwise bland and uniform background are emphasized. The effect can be enhanced by appropriate selection of illuminating spectrum. In the examination of welds, for example, minuscule voids, inclusions, and cracks are more easily detectable by the combination of a bluer illuminating spectrum and a net polarization difference enhancer. Some applications may require a redder spectrum.

For military use, the invention can be used to determine net polarization to discern camouflaged equipment, particularly that having large regions of metal, which tends to have large net polarizations in light reflected from it. Fixed, perpendicularly oriented LPEs attached to a pair of binoculars is perhaps the simplest embodiment of such a device. Currently, camouflage is not generally designed with polarization detectability in mind. With the present invention, the polarization can be viewed directly, or the separate images can be focused onto a focal plane (e.g., a charge coupled device array), detected and stored electronically, normalized, and subtracted; the result is an image showing only differences in net local polarization, where the effects are emphasized even more strongly.

In entertainment, illumination of a scene by polarized light whose polarization changes as a function of time can present some very unusual visual effects, the most prominent of which is an exaggerated but changing 3D effect. One can envision that the invention would provide to an audience such a changing 3D effect by illuminating the performers with light whose polarization varies with time.

In microscopy, net polarization of a sample may provide unique mapping of conductivity on a very fine spatial scale unattainable by any other means. This could be accomplished, for instance, by binocular microscopy or alternate polarization images being stored, normalized, and subtracted, as discussed previously.

The invention will now be described in more detail with reference to the attached drawing, wherein:

BRIEF DESCRIPTION OF THE DRAWING

FIG. 1 is a front view of an ophthalmic device according to the present invention;

FIG. 2 is a front view of an another embodiment of the present invention;

FIG. 3 is a sectional view along line III—III in FIG. 2;

FIG. 4 is a plan view of a detail of FIG. 2; and

FIG. 5 is a enlarged view of a detail of FIG. 3.

DETAILED DESCRIPTION OF THE INVENTION

As shown in FIG. 1, an eyeglass frame 1 has eye apertures 2 and 3 in which a single lens 4 and a single lens 5 are fixedly mounted. The frame i can be made of plastic or metal and can be of the type that clips onto regular glasses or which have ear pieces which would support the glasses on the face of a user. A single lens 4 and 5 in each aperture is advantageous because it keeps the reduction of light to a minimum.

As shown in FIG. 1, lens 4 is a single linearly polarizing element which has its transmission axis disposed horizontally and lens 5 is a single linearly polarizing element which has its polarizing transmission axis disposed vertically so that the axes are disposed at an angle of 90° to each other.

FIGS. 2-5 illustrate another embodiment wherein at least one and preferably both lenses 7, 8 are rotatably mounted in frame 6. In this embodiment, lenses 7 and 8 are the same as lenses 2 and 3 of the previous embodiment.

The rotatable mounting 10 allows rotatable movement of ring 11 relative to frame 6. Mounting 10 comprises a flange 6a on frame 6 which is seated in a corresponding channel 13 in ring 11 to retain the ring adjacent to the frame. The flange 6a is segmented at 6B around the circumference thereof to allow deformation so that it can seat in channel 13. A tab 9 is attached to ring 11 to effect rotation thereof relative to frame 6.

The ring 11 has a channel 15 with depressions 16 which cooperate with detents 14 which are biased by spring 17 and which allow rotation but act to define stable positions. By preferably positioning the detents 16 at angular positions corresponding to 5° increments, a plurality of stable positions is defined for each lens. The corresponding structure 10 is singularly provided for lens 7.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. An ophthalmic device comprising: a frame having a pair of eye apertures, a single linear polarizing element for each aperture, and means for mounting linear polarizing elements at the apertures such that only the single linear polarizing element is in a line of sight of each eye of a user and wherein the means for mounting the linear polarizing elements include means for mounting the at least one of the linear polarizing elements for rotation relative to the frame and independent of the other element.

2. The ophthalmic device according to claim 1, wherein the means for mounting the elements has means for mounting both linear polarizing elements for rotation relative to the frame.

3. The ophthalmic device according to claim 2, wherein the means for mounting the elements for rotation comprises means for defining a plurality of stable angular positions relative to the frame for each of the elements.

4. An ophthalmic device comprising: a frame having a pair of eye apertures, a single linear polarizing element for each aperture, and means for mounting linear polarizing elements at the apertures such that only the single linear polarizing element is in a line of sight of each eye of a user and wherein the means for mounting the linear polarizing elements include means for mounting both the linear polarizing elements for rotation relative to the frame and independent of the other element and means for defining a plurality of stable angular positions relative to the frame for each of the elements, wherein the means for mounting the elements for rotation comprises a mounting ring for each element and surrounding each element, wherein each mounting ring has an axial peripheral surface and a radial peripheral surface facing the frame, a channel in the axial peripheral surface of each ring and wherein the frame has a segmented flange therearound configured to be received in the channel to permit rotation of each ring and element therein relative to the frame while preventing movement away from the frame and wherein the means defining the plurality of stable angular positions comprises a groove with plurality of detents in the radial peripheral surface of each ring and at least one spring biased ball in the frame positioned to roll in the groove and sit in each detent to indicate a stable position.

* * * * *